(12) United States Patent
Wojciechowski et al.

(10) Patent No.: US 6,406,237 B1
(45) Date of Patent: Jun. 18, 2002

(54) METHOD OF ATTACHING A FASTENER ELEMENT TO A PANEL AND FASTENER ELEMENT AND PANEL ASSEMBLY

(75) Inventors: Stanley E. Wojciechowski, Canton; John J. Vrana, Rochester Hills, both of MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

(21) Appl. No.: 09/729,878

(22) Filed: Dec. 5, 2000

(51) Int. Cl.⁷ .......................... F16B 37/04; F16B 39/00; B21D 39/00
(52) U.S. Cl. .................. 411/107; 411/34; 411/183; 411/501; 29/512; 29/523
(58) Field of Search .................. 411/34, 37, 38, 411/54, 54.1, 69, 107, 183, 501, 504, 181, 180; 29/512, 522.1, 523

(56) References Cited

U.S. PATENT DOCUMENTS

| | | | |
|---|---|---|---|
| 3,082,512 A | * 3/1963 | Scheldorf | 411/501 X |
| 4,007,540 A | * 2/1977 | Tyree | 411/504 X |
| 4,831,698 A | 5/1989 | Muller | 29/512 |
| 4,915,558 A | 4/1990 | Muller | 411/179 |
| 6,010,288 A | * 1/2000 | Wisser et al. | 411/54 X |

* cited by examiner

Primary Examiner—Neill Wilson
(74) Attorney, Agent, or Firm—Howard & Howard

(57) ABSTRACT

The fastener of the fastener and panel assembly includes a body portion received in a panel opening and a tubular barrel having a free end extending radially inwardly and a mid-portion bowed outwardly having a diameter greater than the panel opening. The body portion has an outside diameter greater than the inside diameter of the panel opening to form an interference fit providing torque resistance and preventing push-through of the fastener. The method of installing a fastener includes inserting the fastener body portion into the panel opening with the barrel received in a first die member and the body portion supported in the panel opening by a second die member. The end of the barrel is deformed radially inwardly and toward the body portion by the first die member and the midportion of the barrel is deformed radially outwardly preventing withdrawal of the fastener element from the panel. The second die member simultaneously deforms the body of the fastener radially outwardly to form the interference fit with the panel.

59 Claims, 3 Drawing Sheets

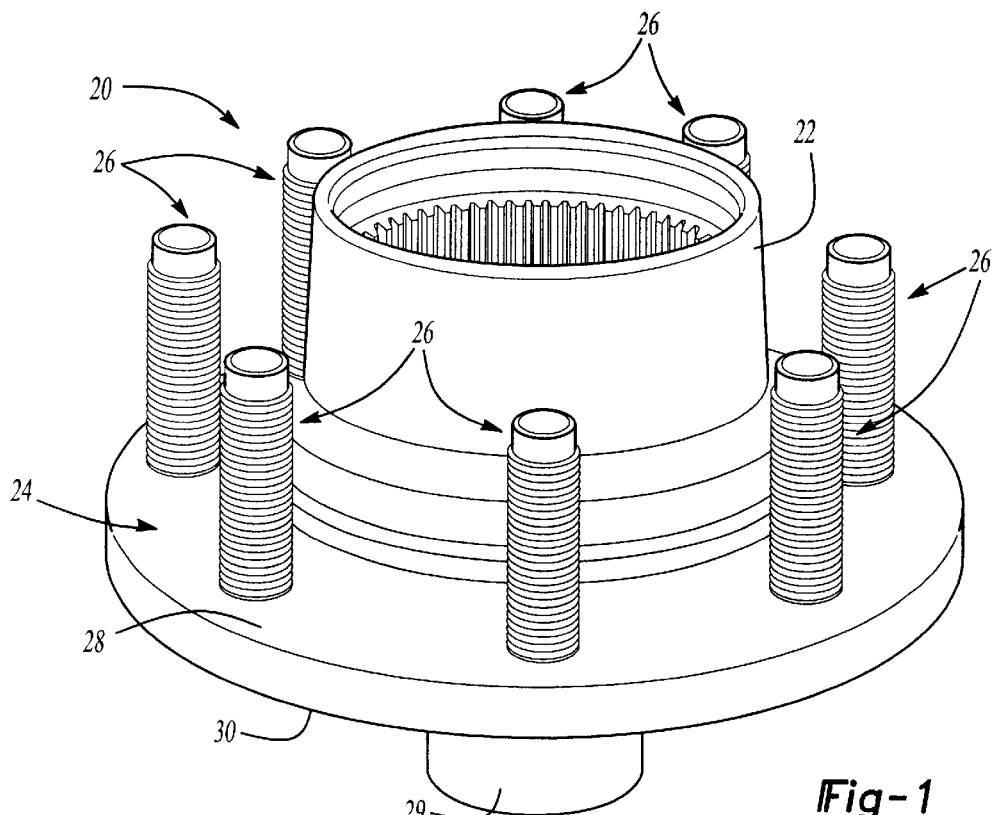
Fig-1
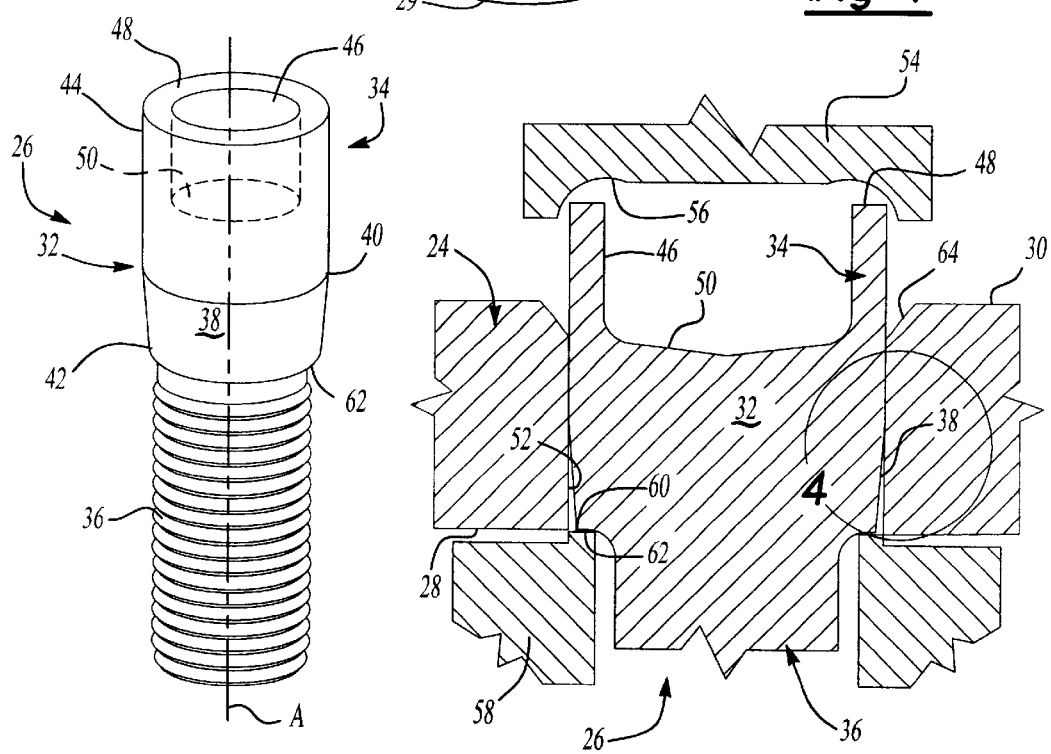
Fig-2   Fig-3

# METHOD OF ATTACHING A FASTENER ELEMENT TO A PANEL AND FASTENER ELEMENT AND PANEL ASSEMBLY

The improved fastener element and panel assembly and method of this invention may be utilized to install a fastener in a relatively thick panel or metal plate to provide a rigid assembly having excellent pull-out and push-through strength and torque resistance and which avoids deformation, damage or even marring of the panel, as may be required for applications where the panel or plate includes a bearing surface, for example, such as a wheel hub assembly.

FIELD AND BACKGROUND OF THE INVENTION

The assignee of the present application and its related companies have developed numerous self-piercing and clinching fastener systems for various applications, including self-piercing male and female fastener systems which are generally adapted for attachment of the fastener to relatively thin panels such as used in mass production applications by the automotive and appliance industries. The integrity of the joint established between the fastener and panel generally depends upon deformation of the metal panel. In the PIERCEFORM® fastener systems of the assignee and its related companies, for example, the fastener includes a body portion, an integral radial flange portion and a tubular barrel portion integral with the flange portion, which pierces the panel and is deformed radially outwardly in an annular female die member into an outwardly opening hook-shape which captures and deforms the panel surrounding the pierced panel opening to form a rigid fastener and panel assembly having excellent pull-out and push-through strength. Examples of such fastener systems may be found in U.S. Pat. Nos. 4,831,698 and 4,915,558. As used herein, "push-through strength" refers to the force required to push the fastener through the panel assembly in the direction the fastener is installed in the panel and "pull-out strength" refers to the force required to pull the fastener out of the assembly in a direction opposite to the direction the fastener is installed in the panel. Torque resistance may also be provided in such fastener systems by ribs or splines generally located on the flange portion adjacent the tubular barrel portion. These fastener systems include self-piercing male fasteners, such as studs and bolts, and female fasteners including threaded and unthreaded nuts. The assignee of this application also developed self-piercing and self-clinching nut fasteners having a pilot portion and an integral flange portion, wherein the pilot portion is installed in a press which may also be utilized to form the metal panel during installation of the fastener as disclosed in U.S. Pat. No. 4,971,499. The pilot portion pierces the panel and the panel adjacent the pierced panel opening is substantially simultaneously deformed into grooves located either in the flange portion adjacent the pilot portion or in the pilot portion by a die member generally referred to as a die button. However, such self-attaching fasteners were also adapted for relatively thin metal panels as required for such applications.

Self-clinching fastener systems have also been developed by the assignee and its related companies which may be utilized in thicker metal panels, but which also generally rely upon some deformation of the panel which limits the range of panel thicknesses to which the fastener may be attached. These fastener systems developed by the assignee and its related companies, particularly Multifastener Corporation, the predecessor in interest of the assignee, and Profil Verbindungstechnik GmbH & Co. KG have been commercially successful, particularly in mass production applications of the type described above. However, there has been a long felt need for a fastener system, wherein the fastener may be installed in a relatively thick panel or plate and which avoids deformation of the panel.

SUMMARY OF THE INVENTION

The fastener of the fastener and panel assembly and method of this invention may be formed by conventional die forming techniques and preferably includes a body portion and an integral tubular barrel portion, preferably coaxially aligned with the body portion. In the disclosed embodiment, the exterior surface of the body portion is generally cylindrical and the exterior surface of the tubular barrel portion is also cylindrical and continuous with the external surface of the body portion. In the most preferred embodiment, the exterior surface of the body portion includes a conical surface having a major diameter adjacent the tubular barrel portion as described further below. However, the body portion may also be polygonal having six or eight sides, for example, and it is believed that the tubular portion could also be polygonal depending upon the application, although it is believed that a tubular barrel portion having a cylindrical exterior surface will be preferred in most applications even where the body portion is polygonal. The disclosed embodiment of the fastener element is a male fastener having a shank portion integral with the body portion opposite the tubular barrel portion which may be threaded, as disclosed. The shank portion preferably has an exterior diameter less than the exterior diameter of the body portion to permit installation of the fastener element in a panel without deforming the panel as disclosed. However, the method of installing a fastener element and fastener and panel assembly of this invention may also be used with a female fastener element, wherein the body portion includes a bore therethrough which may either be prethreaded or threaded following installation by conventional thread forming or thread rolling techniques which would avoid concern regarding distortion of the threads of a prethreaded bore particularly in the most preferred method of this invention, wherein the body portion is deformed radially outwardly to provide a secure interference fit with the opening through the panel.

The method of attaching a fastener element to a panel of this invention includes inserting the free end portion of the tubular barrel portion of the fastener element through an opening in the panel into a die member located opposite the panel opening. The method then includes substantially continuously permanently deforming the tubular barrel portion adjacent the free end portion radially inwardly and toward the body portion and the midportion of the barrel portion radially outwardly in the die member to deform the barrel portion until the midportion has a diameter greater than the panel opening and the free end portion is deformed radially inwardly to limit radial inward flexure of the midportion which would permit withdrawal of the fastener element from the panel opening. In the preferred method of this invention, the body portion located in the panel opening is supported by a second die member opposite the tubular barrel portion and the die members are driven relatively toward one another to simultaneously deform the tubular barrel portion in the first die member as described above and the body portion adjacent the second die member is deformed radially outwardly to form a secure interference fit between the fastener element and the panel opening which provides excellent push-through strength and torque resistance.

In this embodiment, the exterior surface of the body portion includes a conical surface having a major diameter adjacent the tubular barrel portion generally equal to or even slightly larger than the cylindrical diameter of the bore or opening through the panel, thereby forming a secure interference fit or mechanical interlock between the exterior surface of the fastener element and the full length of the body portion which provides excellent push-through strength and torque resistance. Where the fastener element is a male fastener element having an integral shank portion extending from the body portion opposite the tubular barrel portion, the die member preferably has an annular die surface surrounding the shank portion which engages the body portion and which avoids contact with the adjacent surface of the panel. In this embodiment, the first die member which receives the free end portion of the tubular barrel portion is driven toward the second die member which supports the body portion to deform the tubular barrel portion as described without contacting the adjacent surface of the panel. The method of this invention thus avoids any contact with the panel or deformation of the panel, but provides a secure fastener element and panel assembly having excellent push-out and pull-through strength and torque resistance with relatively thick panels or plates.

In the preferred method of attaching a fastener element to a panel of this invention, the method includes forming a chamfer, preferably a conical chamfer in the panel opening adjacent the tubular barrel portion and deforming the midportion of the tubular barrel portion radially outwardly into the chamfer to overlie the panel spaced from the chamfer to provide excellent pull-through strength. Alternatively, the midportion of the tubular barrel portion may be deformed radially outwardly to overlie the panel adjacent the panel opening; however, a conical chamfer supports the radially outwardly bowed portion of the tubular barrel portion and avoids stress fracture of the tubular barrel portion which may be generated by a relatively sharp edge under extreme conditions.

In certain applications, it is desirable to prevent receipt or accumulation of debris in the tubular barrel portion following installation, such as the wheel hub assembly described below. In such applications, the barrel portion may be sealed by partially filling the barrel portion with a suitable polymer and the preferred method of this invention then includes deforming the free end portion of the tubular barrel portion radially inwardly and toward the body portion of the fastener element to overlie and preferably contact the polymer, preventing receipt of debris in the barrel portion. Where the fastener element is a male fastener element having a solid body portion defining a bottom wall of the tubular barrel portion, the polymer is preferably cast in the tubular barrel portion.

The fastener element and panel assembly formed by the method of this invention thus includes a panel having an opening therethrough, a fastener element having a body portion disposed in the panel opening and an integral tubular barrel portion extending from the panel opening having an intermediate portion integral with the barrel portion and a free end portion. The midportion of the tubular barrel portion is bowed outwardly having a major diameter greater than the inside diameter of the panel opening and the free end portion extends radially inwardly from the midportion forming an inwardly opening annular arcuate hook-shape preventing withdrawal of the fastener element from the panel opening. In the most preferred embodiment of the fastener element and panel assembly, the body portion has an outer diameter greater than the inner diameter of the opening through the panel forming a secure interference fit or mechanical interlock between the body portion and the panel providing excellent torque resistance and preventing push-through of the fastener through the panel opening.

As described above, the fastener element may be a male fastener element having a shank portion integral with and extending from the body portion opposite the tubular barrel portion. The hook-shaped tubular barrel portion may be substantially completely filled with a suitable polymer preventing entry of debris and the free end portion of the tubular barrel portion may then overlie and contact the polymer.

The fastener element and panel assembly and method of forming a fastener element and panel assembly of this invention thus provides several advantages over the prior art, particularly in applications requiring rigid attachment of a fastener element to a thick metal panel or plate and wherein the method of assembly does not deform or mar the panel, such as the wheel hub assembly described hereinbelow. Other advantages and meritorious features of the present invention will be more fully understood from the following description of the preferred embodiments, the appended claims and the drawings, a brief description of which follows.

BRIEF DESCRIPTION OF THE DRAWINGS

FIG. 1 is a side perspective view of a wheel hub assembly including a plurality of fastener elements of this invention attached to the rim portion of the hub by the method of this invention;

FIG. 2 is a side perspective view of one embodiment of a fastener element suitable for the method and assembly of this invention;

FIG. 3 is a side cross sectional view of the fastener element shown in FIG. 1 ready for assembly of the fastener element to a metal plate or panel;

DETAILED DESCRIPTION OF A PREFERRED EMBODIMENT

Figure 4:
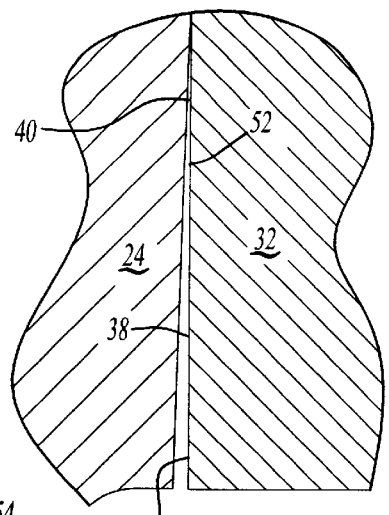
FIG. 4 is a partial enlarged side cross sectional view of FIG. 1.

FIG. 1 illustrates a vehicle wheel hub assembly 20 of the type used to secure a wheel on a vehicle. The wheel hub assembly 20 includes a central splined hub 22, a radial rim or flange portion 24 and a plurality of wheel studs or bolts 26 which project from the surface 28 of the rim portion 24 to secure a wheel on a vehicle. As will be understood by those skilled in the art of wheel hub design, the surface 28 of the rim portion 24 is machined perpendicular to the bearing axis after receipt of the bearing (not shown) on the bearing surface 29. The surface 28 is machined prior to attachment of the wheel bolts 26 which mates with the wheel rotor. The wheel bolts presently used for wheel hub assemblies of the type shown in FIG. 1 have a head and a plurality of longitudinal splines and the wheel bolts are pressed through the rim portion 24 from the surface 30 which causes local distortion of the opposed surface 28 and therefore adversely affects the runout specifications of the rotor and nonuniform wear of the rotor. This condition can also lead to brake chatter, uneven wear of the brake pads and warranty issues. The improved method of attaching a fastener element to a panel and panel assembly of this invention eliminates distortion of the surface 28 and provides excellent pull-out strength. As will be understood, this application of the fastener element 26 must also have sufficient torque resistance to permit bolting of the wheel (not shown) on the wheel hub assembly and sufficient push-through strength to avoid displacement of the wheel bolts during assembly and disassembly of the wheels on the wheel hub.

The fastener element and panel assembly and method of this invention will now be described as applied to the installation of the wheel bolts 26 in the rim portion 24 of the wheel hub assembly 20 shown in FIG. 1. However, as set forth above, the fastener element and panel assembly and method of this invention may be utilized to install various fastener elements to a plate or panel, including female fastener elements, for any application and is particularly suitable for installing fastener elements to a relatively thick panel where deformation or distortion of the panel is preferably avoided. As used herein, the term "panel" is intended to cover any metal plate or panel requiring a fastener of the type described below.

FIG. 2 illustrates the fastener element 26 prior to installation in the panel 24. This embodiment of the fastener element 26 includes a body portion 32, an integral tubular barrel portion 34 and a shank portion 36 integral with the body portion 32 opposite the tubular barrel portion 34. The exterior surface of the body portion 32 in this embodiment preferably includes a conical surface 38 adjacent the end surface 62 as described further hereinbelow having a major diameter at 40 adjacent the tubular barrel portion 34 and a minor diameter at 42 adjacent the end surface 62 of the body portion. The exterior surface 44 and interior surface 46 of the tubular barrel portion may be cylindrical and the free end 48 of the tubular barrel portion 34 may be perpendicular to the longitudinal axis A as shown. In the disclosed embodiment of the male fastener element 26 shown in FIGS. 1 and 2, the shank portion 36 is threaded and the body portion 32 defines a bottom wall 50 of the tubular barrel portion 34, which preferably includes a conical surface 38 as best shown in FIG. 3.

FIGS. 3 to 7 illustrate a preferred method of installing the fastener element 26 shown in FIG. 2 in a panel 24, such as the rim portion of a wheel hub assembly 20 described above. As shown in FIG. 3, the body portion 26 of the fastener element is received in an opening in the panel 24 which in this embodiment is preferably a cylindrical bore 52. The free end 48 of the tubular barrel portion 34 is received in a first die member 54 having a concave generally cylindrical annular die surface 56 and the body portion 32 is supported on a second die member 58 having a flat annular die surface 60 which supports the annular end surface 62 of the body portion opposite the tubular barrel portion 34. In the most preferred embodiment of the fastener element and panel assembly and method of this invention, the cylindrical bore 52 includes a conical chamfer 64 adjacent the surface 30 of the panel 24 which supports the tubular barrel portion 34 during deformation of the barrel portion as described below. FIG. 4 is an enlarged view of the mating surfaces of the body portion 32 of the fastener element and the panel 24. As described, the exterior surface of the body portion 32 in this embodiment includes a preferably conical surface 38 having a major diameter at 40 adjacent the tubular barrel portion and a minor diameter at 42 adjacent the end surface 62 as shown in FIG. 2. The major diameter at 42 is generally equal to or may even be slightly greater than the diameter of the cylindrical bore 52 through the panel 24 and wherein the cone angle of the conical surface 38 is relatively small, such as one to five degrees depending upon the thickness of the panel 24. Thus, the exterior surface of the body portion contacts the cylindrical bore 52 through the panel 24 adjacent the tubular barrel portion but is spaced from the panel 24 adjacent the shank portion as shown in FIGS. 3 and 4.

Figure 5:
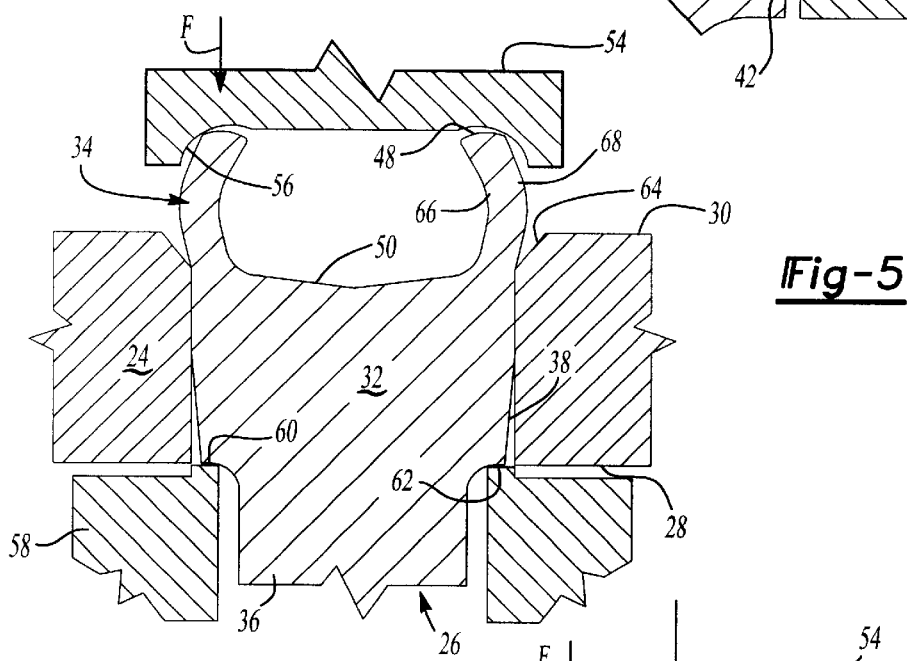
FIG. 5 is a side cross sectional view similar to FIG. 1 during assembly of the fastener element to a plate, such as the rim portion of the wheel hub illustrated in FIG. 1.
Figure 6:
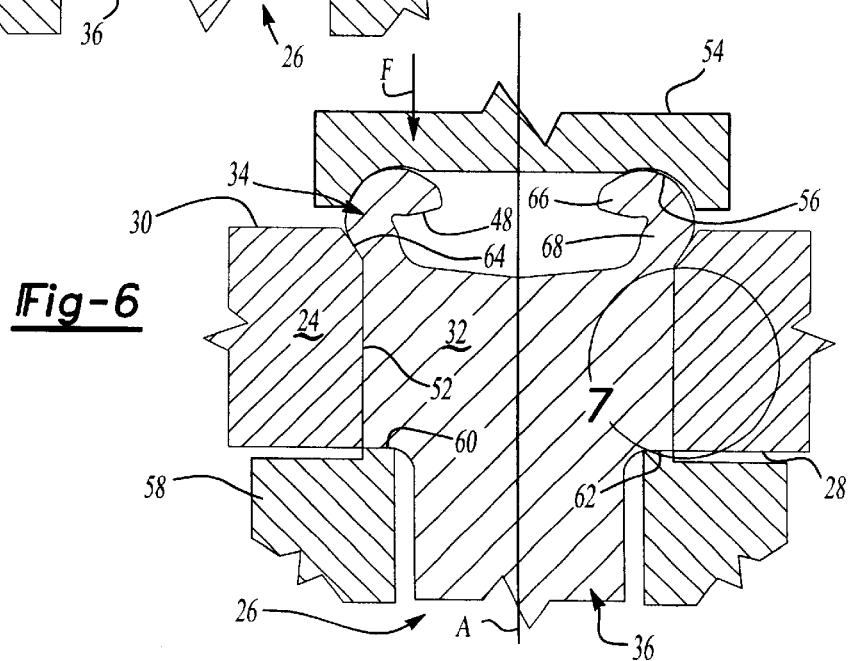
FIG. 6 is a side cross sectional view similar to FIGS. 1 and 5 following assembly of the fastener element to a panel.

FIG. 5 illustrates the initial deformation of the tubular barrel portion by the die member 54. As the die member 54 is driven toward the die member 58 as shown by arrow F, the free end 48 of the tubular barrel portion 34 engages the concave annular die surface 56, deforming the free end portion 66 of the tubular barrel portion radially inwardly and the midportion 68 is simultaneously deformed or permanently bowed outwardly as shown in FIG. 5. The free end portion of the barrel can also be partially rolled inwardly prior to installation to reduce the force or load required for installation. FIG. 6 illustrates the completion of the fastener element and panel assembly by the method of this invention, wherein the first die member 54 is further driven toward the second die member 58, deforming the free end portion 66 of the tubular barrel portion 34 further radially inwardly and toward the body portion 66 and the midportion 68 radially outwardly into the conical chamfer 64, such that the major diameter of the hook-shaped tubular barrel portion is greater than the internal diameter of the panel opening or bore 52. The free end 48 of the tubular barrel portion 34 then extends generally perpendicular to the longitudinal axis A of the fastener element and the hook-shaped tubular barrel portion prevents withdrawal of the fastener element from the panel opening 52.

Figure 7:
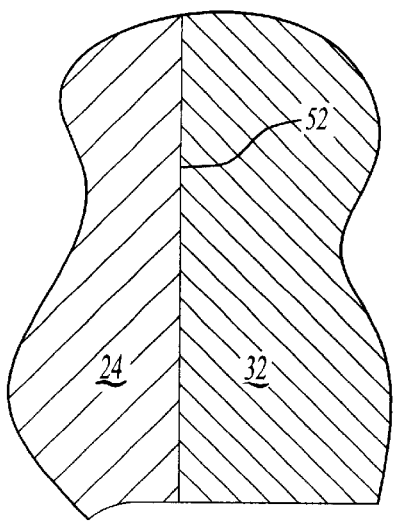
FIG. 7 is an enlarged side cross sectional view of FIG. 6.

FIG. 7, which is an enlarged view of the mating surfaces of the panel 24 and the body portion 32 of the fastener element following installation as shown in FIG. 4 and illustrates the interference fit between the panel 24 and the body portion 32 of the fastener element which provides torque resistance and push-through strength as described below. As the first die member 54 bottoms against the now hook-shaped tubular barrel portion 34, the annular die surface 60 of the second die member 58 deforms the body portion adjacent the die surface 60 radially outwardly, forming an interference fit or mechanical interlock between the surfaces 52 of the panel and 38 of the body portion 32 as shown in FIG. 7. Testing of the fastener element and panel assembly shown in FIG. 6 following installation indicated that the torque resistance of the fastener element in the panel exceeded 180 Newton-meters (Nm) without turning and the push-through strength was about 4,450 Newtons or about 1,000 lbs. force ($lb_f$). Additional torque resistance may be provided by Knurling the exterior surface of the tubular barrel portion 34 adjacent the body portion, such that the Knurled surface engages the chamfered surface 64 following installation. The pull-out strength of the fastener element and panel assembly shown in FIG. 6 exceeds the strength of the bolt. This is because the radially inwardly deformed free end portion 66 prevents the midportion 68 from collapsing inwardly providing sufficient hoop-stress to prevent withdrawal of the fastener element from the panel.

The fastener element and panel assembly of this invention thus exceeds the pull-out, push-through and torque resistance requirements of a wheel hub assembly of the type disclosed in FIG. 1. Further, it is important to note that the second die member 58 never contacts the bearing surface 28 of the hub during assembly of the fastener element to the rim portion 24 of the hub. The annular die surface 60 of the hub 58 contacts only the body portion 62 adjacent the shank portion 36 and the die member 58 is otherwise spaced from the bearing surface 28. Thus, there is no distortion of the bearing surface 28 thereby achieving the final requirement for the wheel hub assembly shown in FIG. 1.

Figure 8:
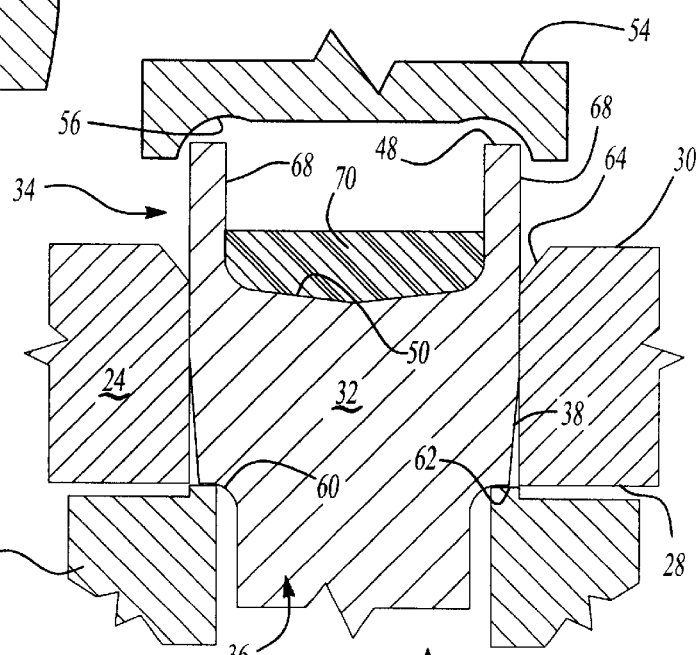
FIG. 8 is a side cross sectional view similar to FIG. 1 wherein the tubular barrel portion of the fastener element is partially filled with a polymer.
Figure 9:
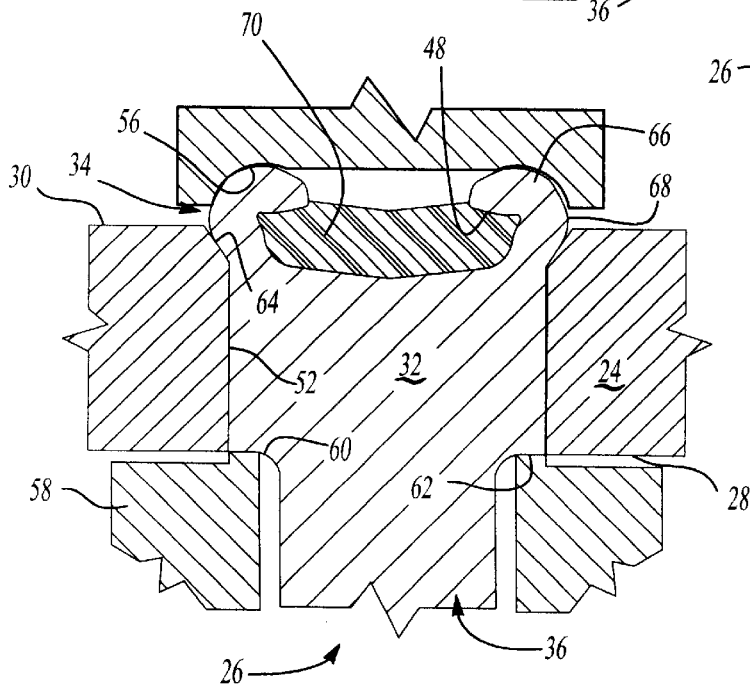
FIG. 9 is a side cross sectional view of the fastener shown in FIG. 8 following installation.

FIGS. 8 and 9 illustrate a method of sealing the fastener element and panel assembly illustrated in the previous figures. The fastener element 26, the panel 24 and the first and second die members 54 and 58, respectively, may be identical to the previous figures described above and therefore have been numbered as set forth above. In this embodiment, however, the tubular barrel portion 34 has been partially filled with a polymer 70, such as Teflon or silicon, prior to installation. Where the fastener element 26 is a male fastener element as disclosed herein, the polymer 70 may be cast in place by pouring a suitable polymer into the tubular barrel portion 34 on the bottom wall 50 as shown in FIG. 8. Where the fastener element is a female fastener element, a polymer plug may be used. Following installation of the fastener element 26 in the panel 24 as shown in FIG. 9, the free end portion 66 of the tubular barrel portion is deformed radially inwardly and toward the body portion, such that the free end 48 of the tubular barrel portion contacts the polymer 70, sealing the tubular barrel portion against entry of road debris as is desirable in this installation. Alternatively, a metal plug or coupon may be inserted into the tubular barrel portion prior to installation.

The fastener element may be formed by conventional die forming technique of various metals depending upon the application, such as SAE 1045 steel. The fastener element may be installed in a panel using a conventional press, wherein the die member 54 is installed in one platen of the press and the second die member 58 is installed in the opposed platen of the press and the panel 24 and fastener element 26 is installed on the die member 58 as shown in FIGS. 3 and 8. The fastener element 26 may be initially installed in the panel 24 from either side of the panel provided an interference fit is not used in the wheel hub assembly, which is another advantage of the method of installing a fastener element in a panel of this invention. Because the fastener element may be installed in a conventional die press used in mass production applications, it will be understood that either of the die members 54 and 58 may be moved toward the other die member or the die members may be simultaneously moved toward each other. Having described preferred embodiments of the fastener element and panel assembly and method of this invention, it will be understood that various modifications may be made within the purview of the appended claims. As described above, the fastener element may take various forms including a female fastener element and the fastener element may be installed in any suitable panel depending upon the application. Having described the preferred embodiments of the invention, the invention is now claimed as follows.

What is claimed is:

1. A fastener element and panel assembly, comprising:

a panel having an opening therethrough;

a fastener element having a body portion disposed in said panel opening and an integral tubular barrel portion extending from said body portion, said body portion having a diameter greater than an inside diameter of said panel opening resulting in an interference fit between said body portion and said panel for preventing rotation of said fastener element in said panel opening;

said tubular barrel portion having a midportion integral with said body portion and a free end portion; and said mid portion of said tubular barrel portion bowed outwardly from said body portion having a diameter greater than said panel opening and said free end portion extending radially inwardly from said midportion forming an inwardly opening hook-shaped barrel portion preventing withdrawal of said fastener element from said panel opening.

2. The fastener element and panel assembly as defined in claim 1, wherein said panel opening includes a conical chamfer adjacent said tubular barrel portion and said outwardly bowed midportion extending radially outwardly into said conical chamfer.

3. The fastener element and panel assembly as defined in claim 1, wherein said tubular barrel portion is substantially filled with a polymer and said free end portion of said tubular barrel portion extends inwardly and overlies said polymer.

4. The fastener element and panel assembly as defined in claim 1, wherein said fastener element is a male fastener element having an integral shank portion extending from said body portion opposite said tubular barrel portion.

5. A fastener element and panel assembly, comprising:

a panel having an opening therethrough with a conical chamfer disposed adjacent said opening;

a fastener element having a body portion disposed in said panel opening and an integral tubular barrel portion extending from said body portion;

said tubular barrel portion having a midportion integral with said body portion and a free end portion; and said mid portion of said tubular barrel portion bowed outwardly from said body portion having a diameter greater than said panel opening such that said outwardly bowed midportion extends radially outwardly into said conical chamfer, and said free end portion extending radially inwardly from said midportion forming an inwardly opening hook-shaped barrel portion preventing withdrawal of said fastener element from said panel opening.

6. A fastener element and panel assembly, comprising:

a panel having an opening therethrough;

a fastener element having a body portion disposed in said panel opening and an integral tubular barrel portion extending from said body portion;

said tubular barrel portion having a midportion integral with said body portion and a free end portion, said tubular barrel portion being substantially filled with a polymer; and said mid portion of said tubular barrel portion bowed outwardly from said body portion having a diameter greater than said panel opening and said free end portion extending radially inwardly from said midportion overlying said polymer, said outwardly bowing mid portion and said inwardly extending free end portion forming an inwardly opening hook-shaped barrel portion preventing withdrawal of said fastener element from said panel opening.

7. A method of attaching a fastener element to a panel, said fastener element including a tubular barrel portion having a midportion and a free end portion, said method comprising:

inserting said free end portion of said fastener element through an opening through said panel into a die member;

forming a chamfer in said panel opening adjacent said tubular barrel portion free end portion;

substantially continuously permanently deforming said tubular barrel portion adjacent said free end portion radially inwardly and said midportion radially outwardly in said die member, such that said midportion deforms radially outwardly into said chamfer to overlie said panel; and continuing to deform said tubular barrel portion of said fastener element in said die member until said midportion is bowed outwardly to overlie said panel adjacent said opening and said free end portion is deformed radially inwardly to limit radial outward flexure of said midportion or withdrawal of said fastener element from said panel opening.

8. The method of attaching a fastener element to a panel as defined in claim 7, wherein said method includes forming said fastener element to include a body portion and said tubular barrel portion extending from said body portion and integral therewith, forming an opening in said panel configured to receive said body portion, inserting said tubular barrel portion through said panel opening, supporting said body portion opposite said tubular barrel portion, permanently deforming said tubular barrel portion towards said body portion and simultaneously deforming said body portion radially in said panel opening to form an interference fit with an inner surface of said panel opening, preventing rotation of said fastener element in said panel.

9. The method of attaching a fastener element to a panel as defined in claim 8, wherein said method includes forming a generally cylindrical external surface on said body portion of said fastener element and forming a generally cylindrical opening through said panel having an internal diameter generally equal to an external diameter of said body portion.

10. The method of attaching a fastener element to a panel as defined in claim 9, wherein said method includes forming a conical external surface on said fastener element body portion having a major diameter adjacent said tubular barrel portion generally equal to an internal diameter of said generally cylindrical opening through said panel and deforming a minor diameter of said conical body portion external surface radially into contact with said generally cylindrical internal surface of said panel opening.

11. The method of attaching a fastener element to a panel as defined in claim 7, wherein said method includes forming a generally cylindrical opening through said panel before inserting said free end portion of said tubular barrel portion through said panel opening.

12. The method of attaching a fastener element to a panel as defined in claim 11, wherein said method includes forming said fastener element including a generally cylindrical body portion and said tubular barrel portion integral with and extending from said cylindrical body portion generally coaxially aligned with and having an outer diameter generally equal to said generally cylindrical body portion, inserting said tubular barrel portion and said generally cylindrical body portion of said fastener element into said cylindrical panel opening with said free end portion extending through said cylindrical opening into said die member.

13. The method of attaching a fastener element to a panel as defined in claim 12, wherein said fastener element is a male fastener element and said method including forming a solid generally cylindrical body portion and a shank portion extending from said body portion opposite said tubular barrel portion and coaxially aligned therewith.

14. The method of attaching a fastener element to a panel as defined in claim 7, wherein said method includes permanently deforming said tubular barrel portion of said fastener element by locating said die member opposite said panel opening, but spaced from said panel, then driving one of said die member and said fastener element together to deform said tubular barrel portion.

15. The method of attaching a fastener element to a panel as defined in claim 14, wherein said method includes driving said die member towards said tubular barrel portion of said fastener element to deform said tubular barrel portion without contacting said die member and said panel member to avoid marring or deformation of said panel member.

16. The method of attaching a fastener element to a panel as defined in claim 7, wherein said method includes deforming said tubular barrel portion adjacent said free end portion into an inwardly opening annular arcuate hook-shaped end portion.

17. The method of attaching a fastener element to a panel as defined in claim 16, wherein said method includes deforming said free end of said tubular barrel portion toward a body portion of said fastener element integral with said tubular barrel portion.

18. The method of attaching a fastener element to a panel as defined in claim 17, wherein said free end portion of said tubular barrel portion includes a generally flat end, and said method including deforming said free end portion of said tubular barrel portion toward said body portion of said fastener element until said flat end is generally perpendicular to the longitudinal access of said fastener element.

19. The method of attaching a fastener element to a panel as defined in claim 7, wherein said method includes partially filling said tubular barrel portion with a polymer prior to deforming said tubular barrel portion and then deforming said free end portion of said tubular barrel portion radially inwardly to contact said polymer.

20. A method of attaching a fastener element to a panel, said fastener element including a body portion and an integral tubular barrel portion having a midportion and a free end portion, said method comprising:

forming a generally cylindrical opening in said panel;

forming a conical external surface on said fastener element body portion including a major diameter generally equal to an inside diameter of said generally cylindrical opening through said panel;

inserting said tubular barrel portion and said body portion of said fastener element into said opening through said panel with said free end portion extending through said panel into a first die member;

substantially simultaneously permanently deforming said free end portion of said tubular barrel portion radially inwardly and toward said body portion and said midportion radially outwardly in said first die member; and continuing to deform said tubular barrel portion of said fastener element in said die member until said midportion of said tubular barrel portion is bowed outwardly having a major diameter greater than said panel opening and said free end portion of said tubular barrel portion is deformed radially inwardly and toward said body portion into an inwardly opening annular arcuate hook-shaped end portion limiting radial inward flexure of said midportion of said tubular barrel portion or withdrawal of said fastener element from said panel opening; and simultaneously deforming a minor diameter of said conical external surface of said fastener body portion radially into contact with an internal surface of said generally cylindrical panel opening forming an interference fit preventing rotation of said fastener element in said panel opening.

21. The method of attaching a fastener element to a panel as defined in claim 20, wherein said method includes supporting said body portion of said fastener element in said panel opening opposite said tubular barrel portion as said tubular barrel portion is permanently deformed in said first die member, thereby deforming said body portion radially in said panel opening and forming an interference fit with an inside surface of said panel opening and preventing rotation of said fastener element relative to said panel.

22. The method of attaching a fastener element to a panel as defined in claim 20, wherein said method includes forming a conical chamfer in said panel opening, said conical chamfer opening outwardly from a surface of said panel adjacent said tubular barrel portion and deforming said midportion of said tubular barrel portion into said conical chamfer to overlie said panel spaced axially from said chamfer.

23. The method of attaching a fastener element to a panel as defined in claim 20, wherein said method includes forming a generally cylindrical opening through said panel before inserting said tubular barrel portion and said body portion of said fastener element into said panel opening.

24. The method of attaching a fastener element to a panel as defined in claim 23, wherein said method includes forming said body portion of said fastener element to include a generally cylindrical exterior surface having an external diameter generally equal to or less than the internal diameter of said generally cylindrical opening through said panel.

25. The method of attaching a fastener element to a panel as defined in claim 24, wherein said fastener element is a male fastener element and said method including forming a solid generally cylindrical body portion and a shank portion having a diameter less than said generally cylindrical body portion extending integrally from said body portion opposite said tubular barrel portion and generally coaxially aligned therewith.

26. The method of attaching a fastener element to a panel as defined in claim 20, wherein said method includes deforming said tubular barrel portion of said fastener element by locating said first die member opposite said panel opening, but spaced from said panel, then driving one of said die member and said free end portion of said fastener element together to permanently deform said tubular barrel portion.

27. The method of attaching a fastener element to a panel as defined in claim 26, wherein said method includes driving said first die member toward said free end portion of said tubular barrel portion to deform said tubular barrel portion without contacting said panel member to avoid marring or deformation of said panel member.

28. The method of attaching a fastener element to a panel as defined in claim 20, wherein said free end portion of said tubular barrel portion includes a generally flat end surface, said method including deforming said free end portion of said tubular barrel portion inwardly and said toward body portion until said end surface extends generally perpendicular to the longitudinal axis of said body portion.

29. The method of attaching a fastener element to a panel as defined in claim 20, wherein said method includes partially filling said tubular barrel portion with a polymer prior to deforming said tubular barrel portion and deforming said free end portion of said tubular barrel portion radially inwardly and toward said polymer to contact said polymer and substantially fill said hook-shaped end portion following deformation.

30. A method of attaching a fastener element to a panel, said fastener element including a body portion and an integral tubular barrel portion extending from said body portion having a free end portion and a midportion between said free end portion and said body portion of said fastener element, said method comprising the following steps:

forming an opening through said panel;

inserting said tubular barrel portion and said body portion of said fastener element into said panel opening with said tubular barrel portion extending through said panel opening into a first die member;

supporting said body portion of said fastener element in said panel opening opposite said tubular barrel portion on a second die member;

driving at least one of said die members toward the other of said die members to thereby permanently deform said free end portion of said tubular barrel portion radially inwardly and toward said body portion, and said midportion of said tubular barrel portion radially outwardly to prevent withdrawal of said fastener element from said panel opening; and deform said body portion of said fastener element radially outwardly forming an interference fit with an inner surface of said panel opening to prevent rotation of said fastener element relative to said panel.

31. The method of attaching a fastener element to a panel as defined in claim 30, wherein said method includes forming a chamfer in said panel opening adjacent said free end portion of said tubular barrel portion and forming said midportion of said tubular barrel portion radially outwardly into said chamfer to overlie said panel spaced from said chamfer.

32. The method of attaching a fastener element to a panel as defined in claim 30, wherein said method includes forming a generally cylindrical opening and a conical external surface on said body portion of said fastener element having a diameter generally equal to an internal diameter of said panel opening.

33. The method of attaching a fastener element to a panel as defined in claim 30, wherein said method includes driving said first die member towards said second die member to deform said tubular barrel portion and retaining said second die member stationary.

34. The method of attaching a fastener element to a panel as defined in claim 30, wherein said method includes deforming said tubular barrel portion adjacent said free end portion into an inwardly opening annular hook-shaped end portion.

35. The method of attaching a fastener element to a panel as defined in claim 30, wherein said method includes at least partially filling said tubular barrel portion with a polymer prior to deforming said tubular barrel portion and deforming said free end portion of said tubular barrel portion towards said body portion to substantially fill said tubular barrel portion with said polymer following deformation.

36. The method of attaching a fastener element to a panel as defined in claim 35, wherein said method includes casting said polymer in said tubular barrel portion.

37. A method of attaching a fastener element to a panel, said fastener element including a tubular barrel portion having a midportion and a free end portion, said method comprising:

forming said fastener element to include a body portion and said tubular barrel portion extending from said body portion and integral therewith, said body portion having generally cylindrical external surface with a major diameter adjacent said tubular barrel portion;

forming a generally cylindrical opening in said panel configured to receive said body portion with an internal diameter of said opening being generally equal to said major diameter of said external surface;

inserting said tubular barrel portion and said free end portion through said panel opening into a die member;

supporting said body portion opposite said tubular barrel portion;

substantially continuously permanently deforming said tubular barrel portion adjacent said free end portion radially inwardly towards said body portion and said midportion radially outwardly in said die member;

continuing to deform said tubular barrel portion of said fastener element in said die member until said midportion is bowed outwardly to overlie said panel adjacent said opening and said free end portion is deformed radially inwardly to limit radial outward flexure of said midportion or withdrawal of said fastener element from said panel opening; and simultaneously deforming a minor diameter of said external surface of said body portion radially into contact with said panel opening to form an interference fit with an inner surface of said panel opening, thereby preventing rotation of said fastener element in said panel.

38. The method of attaching a fastener element to a panel as defined in claim 37, wherein said method includes permanently deforming said tubular barrel portion of said fastener element by locating said die member opposite said panel opening, but spaced from said panel, then driving one of said die member and said fastener element together to deform said tubular barrel portion.

39. The method of attaching a fastener element to a panel as defined in claim 38, wherein said method includes driving said die member towards said tubular barrel portion of said fastener element to deform said tubular barrel portion without contacting said die member and said panel member to avoid marring or deformation of said panel member.

40. A method of attaching a fastener element to a panel, said fastener element including a tubular barrel portion having a midportion and a free end portion, wherein said free end portion includes a generally flat end, said method comprising:

inserting said free end portion of said fastener element through an opening through said panel into a die member;

substantially continuously permanently deforming said tubular barrel portion adjacent said free end portion radially inwardly and said midportion radially outwardly in said die member; and continuing to deform said tubular barrel portion of said fastener element in said die member until said midportion is bowed outwardly to overlie said panel adjacent said opening and said free end portion is deformed radially inwardly toward a body portion of said fastener element until said flat end is generally perpendicular to the longitudinal axis of said fastener element to limit radial outward flexure of said midportion or withdrawal of said fastener element from said panel opening.

41. A method of attaching a fastener element to a panel, said fastener element including a tubular barrel portion having a midportion and a free end portion, said method comprising:

inserting said free end portion of said fastener element through an opening through said panel into a die member;

substantially continuously permanently deforming said tubular barrel portion adjacent said free end portion radially inwardly and said midportion radially outwardly in said die member;

continuing to deform said tubular barrel portion of said fastener element in said die member until said midportion is bowed outwardly to overlie said panel adjacent said opening and said free end portion is deformed radially inwardly to limit radial outward flexure of said midportion or withdrawal of said fastener element from said panel opening; and partially filling said tubular barrel portion with a polymer prior to deforming said tubular barrel portion and then deforming said free end portion of said tubular barrel portion radially inwardly to contact said polymer.

42. A method of attaching a male fastener element to a panel, said fastener element including a solid generally cylindrical body portion, an integral tubular barrel portion having a midportion and a free end portion, and a shank portion having a diameter less than said generally cylindrical body portion extending integrally from said body portion opposite said tubular barrel portion and generally coaxially aligned therewith, said method comprising:

inserting said tubular barrel portion and said body portion of said fastener element into an opening through said panel with said free end portion extending through said panel into a first die member;

substantially simultaneously permanently deforming said free end portion of said tubular barrel portion radially inwardly and toward said body portion and said midportion radially outwardly in said first die member; and continuing to deform said tubular barrel portion of said fastener element in said die member until said midportion of said tubular barrel portion is bowed outwardly having a major diameter greater than said panel opening and said free end portion of said tubular barrel portion is deformed radially inwardly and toward said body portion into an inwardly opening annular arcuate hook-shaped end portion limiting radial inward flexure of said midportion of said tubular barrel portion or withdrawal of said fastener element from said panel opening.

43. The method of attaching a fastener element to a panel as defined in claim 42, wherein said method includes supporting said body portion of said fastener element in said panel opening opposite said tubular barrel portion as said tubular barrel portion is permanently deformed in said first die member, thereby deforming said body portion radially in said panel opening and forming an interference fit with an inside surface of said panel opening and preventing rotation of said fastener element relative to said panel.

44. The method of attaching a fastener element to a panel as defined in claim 42, wherein said method includes forming a generally cylindrical opening through said panel before inserting said tubular barrel portion and said body portion of said fastener element into said panel opening.

45. The method of attaching a fastener element to a panel as defined in claim 44, wherein said method includes forming said body portion of said fastener element to include a generally cylindrical exterior surface having an external diameter generally equal to or less than the internal diameter of said generally cylindrical opening through said panel.

46. A method of attaching a fastener element to a panel, said fastener element including a body portion and a tubular barrel portion with the tubular barrel portion having a midportion and a free end portion and said panel having an opening, said method comprising:

inserting said body portion and said free end portion of said tubular barrel portion through said panel opening into a die member, wherein a major diameter of said body portion abuts said panel opening;

permanently deforming said tubular barrel portion adjacent said free end portion radially inwardly toward said body portion and said midportion radially outwardly in said die member to limit radial outward flexure of said midportion or withdrawal of said fastener element from said panel opening; and simultaneously deforming a minor diameter of said body portion radially into contact with said panel opening to form an interference fit with an inner surface of said panel opening, thereby preventing rotation of said fastener element in said panel.

47. The method of attaching a fastener element to a panel as defined in claim 46, wherein said method includes forming a chamfer in said panel opening adjacent said free end portion of said tubular barrel portion and deforming said midportion of said tubular barrel portion radially outwardly into said chamfer to overlie said panel.

48. The method of attaching a fastener element to a panel as defined in claim 46, wherein said fastener element is a male fastener element and said method including forming a solid generally cylindrical body portion and a shank portion extending from said body portion opposite said tubular barrel portion and coaxially aligned therewith.

49. The method of attaching a fastener element to a panel as defined in claim 46, wherein said method includes permanently deforming said tubular barrel portion of said fastener element by locating said die member opposite said panel opening, but spaced from said panel, then driving one of said die member and said fastener element together to deform said tubular barrel portion.

50. The method of attaching a fastener element to a panel as defined in claim 49, wherein said method includes driving said die member towards said tubular barrel portion of said fastener element to deform said tubular barrel portion without contacting said die member and said panel member to avoid marring or deformation of said panel member.

51. The method of attaching a fastener element to a panel as defined in claim 46, wherein said method includes deforming said tubular barrel portion adjacent said free end portion into an inwardly opening annular arcuate hook-shaped end portion.

52. The method of attaching a fastener element to a panel as defined in claim 46, wherein said free end portion of said tubular barrel portion includes a generally flat end, and said method including deforming said free end portion of said tubular barrel portion toward said body portion of said fastener element until said flat end is generally perpendicular to the longitudinal access of said fastener element.

53. The method of attaching a fastener element to a panel as defined in claim 46, wherein said method includes partially filling said tubular barrel portion with a polymer prior to deforming said tubular barrel portion and then deforming said free end portion of said tubular barrel portion radially inwardly to contact said polymer.

54. A method of attaching a fastener element to a panel, said fastener element including a body portion and a tubular barrel portion with the tubular barrel portion having a midportion and a free end portion and said panel having outer surfaces and an opening, said method comprising:

inserting said tubular barrel portion and said free end portion through said panel opening into a die member;

substantially continuously permanently deforming said tubular barrel portion adjacent said free end portion radially inwardly towards said body portion and said midportion radially outwardly in said die member;

continuing to deform said tubular barrel portion of said fastener element in said die member until said midportion is bowed outwardly and said free end portion is deformed radially inwardly such that said outwardly bowed midportion has a major diameter greater than said panel opening without contacting said outer surfaces of said panel to avoid marring or deformation of said panel, and said inwardly deformed free end portion limiting radial outward flexure of said midportion or withdrawal of said fastener element from said panel opening.

55. The method of attaching a fastener element to a panel as defined in claim 54, wherein said method includes simultaneously deforming said body portion radially in said panel opening to form an interference fit with an inner surface of said panel opening thereby preventing rotation of said fastener element in said panel.

56. The method of attaching a fastener element to a panel as defined in claim 55, wherein said method includes forming a generally cylindrical external surface on said body portion of said fastener element and forming a generally cylindrical opening through said panel having an internal diameter generally equal to an external diameter of said body portion.

57. The method of attaching a fastener element to a panel as defined in claim 56, wherein said method includes forming a conical external surface on said fastener element body portion having a major diameter adjacent said tubular barrel portion generally equal to said internal diameter of said generally cylindrical opening through said panel and deforming a minor diameter of said conical body portion external surface radially into contact with said generally cylindrical internal surface of said panel opening.

58. The method of attaching a fastener element to a panel as defined in claim 54, wherein said method includes permanently deforming said tubular barrel portion of said fastener element by locating said die member opposite said panel opening, but spaced from said panel, then driving one of said die member and said fastener element together to deform said tubular barrel portion.

59. The method of attaching a fastener element to a panel as defined in claim 54, wherein said method includes driving said die member towards said tubular barrel portion of said fastener element to deform said tubular barrel portion without contacting said die member and said panel member to avoid marring or deformation of said panel member.

* * * * *